US008662424B2

(12) United States Patent
Meis

(10) Patent No.: US 8,662,424 B2
(45) Date of Patent: Mar. 4, 2014

(54) IRRIGATION AND SPRAYING METHOD

(75) Inventor: Charles H. Meis, Albion, NE (US)

(73) Assignee: Lindsay Corporation, Omaha, NE (US)

( * ) Notice: Subject to any disclaimer, the term of this patent is extended or adjusted under 35 U.S.C. 154(b) by 856 days.

(21) Appl. No.: 12/712,817

(22) Filed: Feb. 25, 2010

(65) Prior Publication Data
US 2011/0204156 A1 Aug. 25, 2011

(51) Int. Cl.
*B05B 3/00* (2006.01)

(52) U.S. Cl.
USPC ........... 239/727; 239/726; 239/728; 239/742; 239/302

(58) Field of Classification Search
USPC ......... 239/722, 723, 726, 727, 728, 310, 318, 239/548, 172, 175, 302, 742
See application file for complete search history.

(56) References Cited

U.S. PATENT DOCUMENTS

| 4,277,026 | A | * | 7/1981 | Garvey | 239/127 |
| 4,397,421 | A | * | 8/1983 | Schram | 239/727 |
| 5,016,817 | A | * | 5/1991 | Ghate et al. | 239/113 |
| 5,927,603 | A | * | 7/1999 | McNabb | 239/63 |
| 6,820,828 | B1 | * | 11/2004 | Greenwalt | 239/726 |

* cited by examiner

*Primary Examiner* — Steven J Ganey
(74) *Attorney, Agent, or Firm* — Hovey Williams LLP

(57) ABSTRACT

An irrigation machine is selectively converted into a sprayer for applying chemicals that have been approved for use only by spraying equipment. A method is disclosed for irrigating and spraying crops using the same conduit connected to either an irrigation ground water source or a sprayer-approved chemical source, but at no time is the conduit connected to both sources simultaneously. The method includes connecting the input of a conduit to a ground water source, irrigating the crops with water from the ground water source, disconnecting the input of the conduit from the ground water source, connecting the input of the same conduit to a sprayer-approved chemical source, and spraying the crops with chemical from the chemical source.

10 Claims, 1 Drawing Sheet

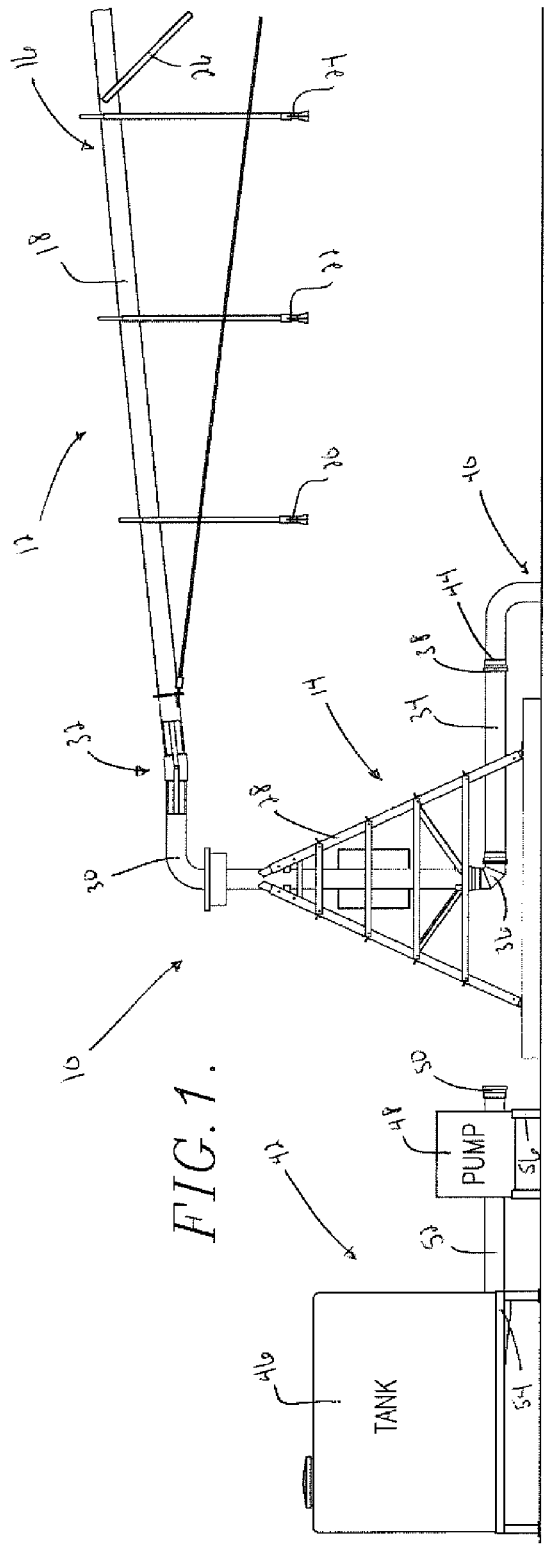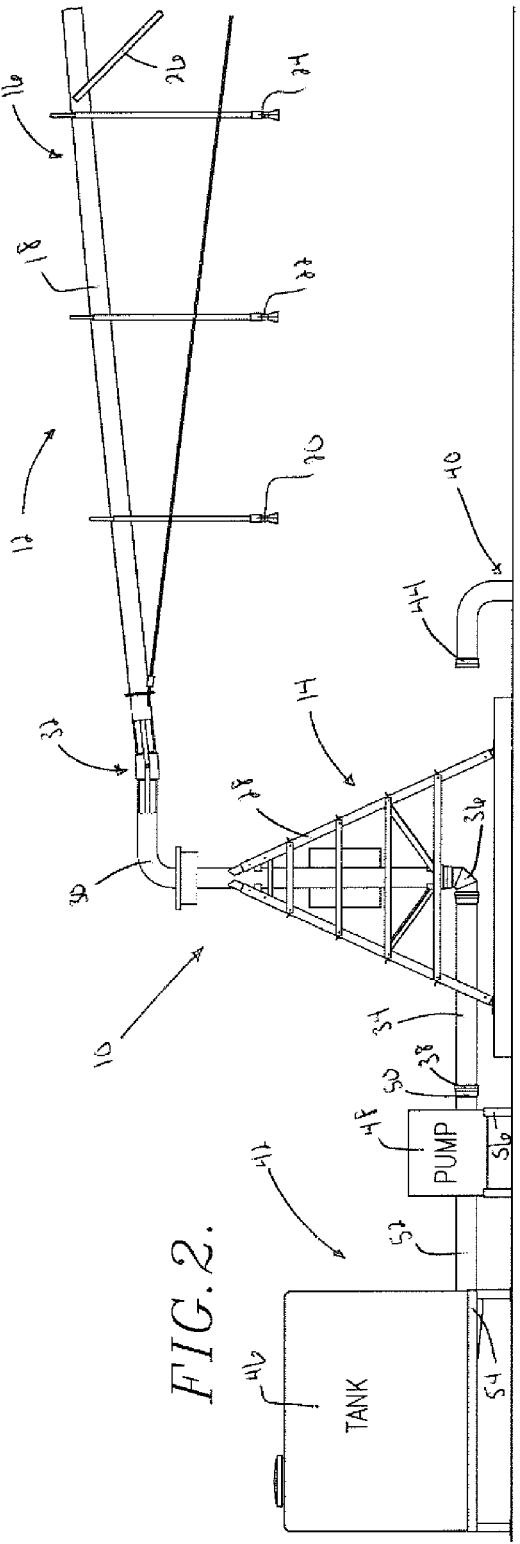

US 8,662,424 B2

IRRIGATION AND SPRAYING METHOD

TECHNICAL FIELD

The present invention relates generally to agricultural irrigation and spraying systems. More particularly, the present invention concerns a way of converting an irrigation machine into a sprayer so the converted machine can be used to apply chemicals that are only approved for sprayers to a field of crops or the like.

BACKGROUND

Agricultural irrigation and spraying systems, such as center pivot machines, are commonly used to distribute water and/or fertilizer and the like to crops in a field. A center pivot machine typically includes, among other things, a central pivot communicating with a source of ground water, chemical, or both, a series of mobile support towers connected to the central pivot and to one another by truss-type framework sections, a plurality of elevated conduits supported by the framework sections, and a number of sprinkler heads, spray guns, drop nozzles, or other fluid-emitting devices spaced along the length of the conduits. The mobile support towers are supported on wheels that are typically driven to move the system in a generally circular path about the central pivot to distribute the water, chemical, or both to crops in a field.

Conventionally, irrigation machines that are connected to a source of ground water can have certain approved chemical fertilizers, herbicides and insecticides injected into the main conduit of the machine downstream from a check valve that guards the ground water source from contamination by the chemicals. This process is sometimes referred to as "chemigation." Other more potent chemicals may be approved by the Environmental Protection Agency ("EPA") only for field application by sprayers that are separate and distinct pieces of equipment from the irrigation machines. Such arrangements provide satisfactory performance in some respects, although those of ordinary skill in the art will appreciate that it is expensive to provide and maintain separate conduit and emitter systems for each of the water and chemical distributions.

SUMMARY

The present invention provides a way of converting irrigation equipment, such as a center pivot irrigation machine, into a sprayer so the converted machine can be used to spray chemicals onto a field that have only been approved for application by spraying equipment. It involves a method of irrigating and spraying crops using the same main conduit of the machine in liquid flow communication with different sources at different times. In a most preferred embodiment, the conduit is connected either to a ground water source for irrigating or a sprayer-approved chemical source for spraying, but at no time is the conduit connected to both sources simultaneously. Another embodiment contemplates selectively terminating communication between the ground water source and the conduit by mechanically blocking such communication rather than completely mechanically disconnecting the ground water source from the conduit.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWINGS

A preferred embodiment of the present invention is described in detail below with reference to the attached drawing figures, wherein:

FIG. 1 is fragmentary elevation view on a reduced scale of an agricultural irrigation and spraying system constructed in accordance with the principles of the present invention and capable of carrying out my novel method, particularly illustrating a span conduit connected to a water source for irrigating operations.

FIG. 2 is a fragmentary elevation view of the irrigation and spraying system shown in FIG. 1, particularly illustrating the span conduit connected to a chemical source for spraying operations.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, an irrigation and spraying system 10 selected for purposes of illustration is a center pivot system that broadly includes a main section 12 and a central pivot 14. The main section 12 broadly includes a span 16 and further includes additional interconnected spans (not shown) supported by mobile towers (not shown), as will be readily appreciated by one of ordinary skill in the art. It will also be recognized that the main section 12 may include any number of spans and mobile towers and further that the principles of the present invention are not limited to use with a center pivot system, but may also be employed with other types of systems, including for example, lateral move systems or others that do not employ a fixed, central pivot.

The span 16 includes a liquid carrying conduit 18 that is connected in fluid flow communication with all similar conduits of the system to provide liquid along the length of the main section 12. Fluid emitters 20, 22, and 24 extend from the conduit 18 in fluid flow communication therewith and distribute liquid from the conduit 18 across a field. The fluid emitters 20, 22, and 24 of the illustrated embodiment comprise drop nozzles, but could similarly include sprinkler heads, spray guns, or other types of fluid emitting devices, without departing from the teachings of the present invention. Those of ordinary skill in the art will appreciate that the conduit 18 of the span 16 may include any number of such fluid emitters 20, 22, and 24, without departing from the principles of the present invention. As is conventional, the liquid carrying conduit 18 is slightly arched or bowed upward when empty and is supported in such condition by a truss-type framework 26 or other supports connected to the conduit 18 and disposed below the same.

The central pivot 14 broadly includes a stabilizing frame 28 that supports a source conduit 30. One end of the source conduit 30 connects to the liquid carrying conduit 18 of the span 16 at a junction 32. The other end of the source conduit 30 connects to an input conduit 34 at a rotatable elbow 36. One end of the input conduit 34 connects to the source conduit 30 at the elbow 36 and the other end of input conduit 34 presents a connecting end 38. The connecting end 38 of the input conduit 34 may be selectively coupled in fluid flow communication with either an irrigation ground water source 40 as illustrated in FIG. 1 or with a chemical source 42 as shown in FIG. 2.

It is noted that in the illustrated embodiment, the connecting end 38 of the input conduit 34 comprises an eight inch ring lock, although it is clearly within the ambit of the present invention for a connecting end to include different sizes or attachment configurations. It is also noted that a back flow preventer valve (not shown) is included within the liquid carrying conduit 18 to prevent liquid in the conduit 18 from flowing backward and out through the source conduit 30 to the ground water source 40.

The irrigation ground water source 40 comprises a well (not shown), or other source of irrigation water, as is known in the art, and includes a water connector 44. The water connector 44 is configured for selective attachment/detachment to the connecting end 38 of the input conduit 34.

The chemical source 42 comprises a chemical tank 46, a pump 48, and a chemical connector 50. The chemical connector 50 is configured for selective attachment to the connecting end 38 of the input connector 34. A connecting conduit 52 provides fluid communication between the tank 46 and the pump 48. For typical chemical spraying operations, an eight thousand gallon chemical tank can be used to supply adequate chemical for an application rate of seventy gallons per acre, although it is clearly within the ambit of the present invention to use a chemical tank of another size and any desired chemical application rate. In the illustrated embodiment, the chemical tank 46 is disposed on a tank trailer 54 and, similarly, the pump 48 is disposed on a pump trailer 56. The tank trailer 54 and the pump trailer 56 facilitate movement of the chemical tank 46 and the pump 48, respectively, to a location near the central pivot 14 for connection and use therewith. The chemical or chemicals stored in the tank 46 are typically, although not necessarily, selected from a group of such chemicals that have been approved by the EPA or other regulatory authority for use only with spraying equipment.

In FIG. 1 the irrigation and spraying system 10 is configured to irrigate a field using water from the irrigation ground water source 40. The elbow 36 is disposed to align the connecting end 38 of the input conduit 34 of the central pivot 14 with the water connector 44. In this configuration, there is no connection or fluid flow communication between the input conduit 34 of the central pivot 14 and the chemical source 42. Alternatively, as shown in FIG. 2, the converted machine is configured as a sprayer to spray chemical on a field from the chemical source 42. The elbow 36 has been rotated from its disposition in FIG. 1 and is disposed to align the connecting end 38 of the input conduit 34 of the central pivot 14 with the chemical connector 50. In this configuration, there is no connection or fluid flow communication between the input conduit 34 of the central pivot 14 and the irrigation ground water source 40.

Operation

For irrigating operations, the connecting end 38 of the input conduit 34 of the central pivot 14 is connected with the water connector 44 of the irrigation water source 40. The irrigation water flows from the water source 40, through the source conduit 30, and into the liquid conduit 18 of the span 16 of the irrigation and spraying machine 10. The irrigation water is distributed from the liquid conduit 18, out of the fluid emitters 20, 22, and 24, and onto the field as the main section 12 moves by rotating about the central pivot 14. The main section 12 of the machine 10 is moved through the field in a manner known in the art, such as by driving one or more wheels (not shown) on the mobile towers (not shown) to rotate the spans of the main section 12 about the central pivot 14. During irrigating operations, the main section 12 of the machine 10 is typically driven through the field at a relatively slow rate of speed, for example at a speed of three feet per minute, as will be appreciated by one of ordinary skill in the art.

For spraying operations, the irrigating process is terminated and connecting end 38 of the input conduit 34 of the central pivot 14 is completely disconnected from the water connector 44 of the irrigation water source 40. The elbow 36 of the input conduit 34 is rotated or otherwise moved to align the input conduit 34 of the central pivot 14 with the chemical connector 50 of the chemical source 42. The connecting end 38 of the input conduit 34 of the central pivot 14 is connected with the chemical connector 50 of the chemical source 42. The chemicals flow from the chemical tank 46, through the connecting conduit 52, and are driven by the pump 48, through the source conduit 30, and into the same liquid conduit 18 of the span 16 of the irrigation and spraying machine 10. The chemicals are distributed from the liquid conduit 18, out of the same fluid emitters 20, 22, and 24, and onto the field as the main section 12 moves by rotating about the central pivot 14. The main section 12 of the machine 10 is moved through the field in a manner known in the art and similar in many respects to the movement of the main section 12 during irrigating operations, as discussed above.

During spraying operations, the main section 12 of the machine 10 is typically driven through the field at a faster rate of speed than during irrigating operations, for example at a speed of seventy feet per minute. Such a faster speed during spraying operations allows the chemical to be applied at a lower gallonage per acre than the irrigation water, as will be readily appreciated by one of ordinary skill in the art. It is noted that the difference in gallonage per acre in the distribution of irrigation water and chemical may be further facilitated by the use of high speed motors on the towers (not shown) and/or rapid cycling valves (not shown) that control output of the fluid from the emitters 20, 22, and 24. It could also be achieved by installing and using a different set of lower gallonage emitters. As discussed above, the chemicals applied during spraying operations may be selected from the group of chemicals that are approved by the EPA or other authority for use only with spraying equipment. In this particular embodiment, the input conduit 34 of the central pivot 14 is never connected to both the ground water source 40 and the chemical source 42 at the same time, thus preventing any possible contamination of a ground water supply.

For subsequent irrigating operations, the spraying process is terminated and connecting end 38 of the input conduit 34 of the central pivot 14 is completely disconnected from the chemical connector 50 of the chemical source 42. The elbow 36 of the input conduit 34 is rotated or otherwise moved to align the input conduit 34 of the central pivot 14 with the water connector 44 of the irrigation water source 40. The connecting end 38 of the input connector 34 of the central pivot 14 is connected with the water connector 44 of the irrigation water source 40. As discussed above, any remaining chemical in the liquid conduit 18 is prevented from entry into the irrigation water source 40 by the back flow prevention valve (not shown). Additionally, the liquid conduit 18 can be flushed out to remove any remaining chemical from the conduit 18. For example, the main section 12 of the machine 10 can be moved in a flushing mode through the field at a higher rate of speed than typically used during normal irrigating operations for one rotation of the main section 12 about the central pivot 14. Using the illustrative speeds discussed above, the main section 12 of the machine 10 can be driven through the field at the seventy feet per minute speed typically used during spraying operations to flush any remaining chemical out of the liquid conduit 18 and then the speed can be decreased to the typical slower rate of speed for irrigating operations, such as the three feet per minute discussed above.

In this way, the same liquid conduit 18 and the same fluid emitters 20, 22, and 24 of the main section 12 of the machine 10 are selectively used to distribute irrigation water or sprayer-approved chemicals, but the chemical source 42 is never in direct communication with a ground water source. The input conduit 34 of the central pivot 14 is connected to either the water source 40 or the chemical source 42, but never both at the same time.

Alternative Embodiment

In an alternative, less preferred embodiment of the invention, the source conduit 30 may be provided with a Tee connection (not shown) or the like at its lower end wherein one branch of the Tee leads to the irrigation ground water source 40 and another branch leads to the chemical source 42. Suitable shut off valves (not shown) may be provided in association with the Tee branches for the purpose of selectively blocking and thus terminating fluid flow communication between the respective source and the main conduit 18 of the machine. This eliminates the need to completely mechanically disconnect the particular source from the main conduit when converting between the irrigation mode and the spraying mode.

The preferred forms of the invention described above are to be used as illustration only, and should not be utilized in a limiting sense in interpreting the scope of the present invention, which is defined by the claims below. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. A method of irrigating and spraying a field, said method comprising the steps of:
    establishing liquid flow communication between a ground water source and a conduit, the conduit comprising a span conduit of a center pivot system;
    irrigating the field with water from the ground water source by emitting the water out from the conduit;
    terminating liquid flow communication between the ground water source conduit and the conduit by detaching a lower elbow of an input of the span conduit from the ground water source and rotating it away from the ground water source;
    establishing liquid flow communication between a chemical source and the conduit; and
    while liquid flow communication is terminated between the ground water source and the conduit, spraying the field with chemical from the chemical source by emitting the chemical out from the conduit.

2. The irrigating and spraying method as claimed in claim 1,
    said step of establishing liquid flow communication between the chemical source and the conduit including rotating said lower elbow into general alignment with the chemical source.

3. The irrigating and spraying method as claimed in claim 2,
    said spraying step including emitting the chemical out of the same emitters from which the water is emitted during the irrigating step.

4. The irrigating and spraying method as claimed in claim 3,
    said spraying step including preventing chemical from flowing backwards out of the span conduit.

5. The irrigating and spraying method as claimed in claim 4; and
    flushing out the span conduit to purge the chemical from the span conduit.

6. The irrigating and spraying method as claimed in claim 5,
    said spraying step including moving the span conduit at a higher ground speed around the center pivot than during said irrigating step.

7. The irrigating and spraying method as claimed in claim 6,
    said flushing step including moving the span conduit at the higher ground speed of the spraying step while the span conduit is in communication with the ground water source.

8. The irrigating and spraying method as claimed in claim 7,
    said spraying step including applying chemicals that are selected from a group of chemicals approved by law for spray applications.

9. The irrigating and spraying method as claimed in claim 8,
    said irrigating step including directly injecting mixing chemicals into the span conduit with the water,
    said mixing chemicals being selected from said group of chemicals that are approved by law for spray applications.

10. A method of irrigating and spraying a field, said method comprising the steps of:
    establishing liquid flow communication between a ground water source and a conduit;
    irrigating the field with water from the ground water source by emitting the water out from the conduit;
    terminating liquid flow communication between the ground water source conduit and the conduit by mechanically disconnecting an input of the conduit from the ground water source;
    establishing liquid flow communication between a chemical source and the conduit; and
    while liquid flow communication is terminated between the ground water source and the conduit, spraying the field with chemical from the chemical source by emitting the chemical out from the conduit.

* * * * *